UNITED STATES PATENT OFFICE.

JOHN HARSHFIELD, OF SUTHERLAND, NEBRASKA.

LIQUID COMPOSITION FOR THE TREATMENT OF BINDING-TWINE.

1,347,508.  Specification of Letters Patent.  Patented July 27, 1920.

No Drawing.  Application filed January 9, 1920. Serial No. 350,433.

*To all whom it may concern:*

Be it known that I, JOHN HARSHFIELD, a citizen of the United States, residing at Sutherland, in the county of Lincoln and State of Nebraska, have invented a certain new and useful Liquid Composition for the Treatment of Binding-Twine, and have described the same in the following specification.

My invention relates in general to those preservative compositions of matter which consist of liquid ingredients and are commonly applied by saturation, soaking or other impregnation, to twines, fabrics, and like manufactured articles of fibrous material which is of either vegetable or animal origin. It relates in particular to such a mixture for the treatment of the twine which is commonly used for binding grain into bundles in harvest fields. It is the main object of the invention to protect the twine to which it is applied from the ravages of grasshoppers and other insects; to increase the strength of the twine; to preserve the same from rot, mold and from decay caused by exposure to the weather; and in general to produce a superior mixture for the treatment of such twine.

The composition is a mixture of kerosene oil, lubricating oil and a water-gas residue sometimes called taroleum. The lubricating oil may be ôf any common variety, and the water-gas residue is a common by-product of the process of producing carbonated water gas from gas oil, so called. In preparing the composition, I prefer to use these ingredients in the following proportions, viz.:

Kerosene oil, fifteen per cent.;
Lubricating oil, fifteen per cent.;
Water-gas residue, seventy per cent.

The ingredients may be suitably mixed by merely stirring them together at ordinary temperatures; and the mixture may be applied to the twine by submerging or soaking the latter therein for a few minutes and until saturated. Then the twine is removed from the mixture; and the adhering surplus, if any, of the liquid may be permitted to drip or drain away, leaving the twine ready for use in the field. By this treatment the twine is waterproofed, increased in tensile strength, preserved from rotting, molding and weather decay and made repellent in taste and smell, as well as poisonously destructive, to grasshoppers, crickets, mice and other vermin to whose depredations it is exposed when in use. The composition is believed to possess in a high degree all the desirable properties of a mixture for the treatment of twine for binding grain, and is applicable in a similar manner and with similar advantages to cordage, tenting-cloth, canvas, and other fabrics and fibrous goods, needing similar protection.

I claim as my invention—

1. A mixture for the treatment of binding twine and other porous articles for the purpose of waterproofing, strengthening and protecting the same from rot and weather decay as well as from grasshoppers, crickets and other vermin, consisting of fifteen per cent. of kerosene oil, fifteen per cent. of lubricating oil, and seventy per cent. of taroleum.

2. A preservative mixture for the treatment of porous articles by impregnation, consisting of approximately equal proportions of lubricating oil and kerosene oil, and a principal proportion of water gas residue.

Witness my signature at Sutherland, Nebraska, January 5, 1920.

JOHN HARSHFIELD.